United States Patent [19]

Cooper

[11] 4,189,906
[45] Feb. 26, 1980

[54] TOMATO HARVESTER ATTACHMENT

[76] Inventor: George H. Cooper, 13841 SW. 252nd St., Princeton, Fla. 33032

[21] Appl. No.: 914,609

[22] Filed: Jun. 12, 1978

[51] Int. Cl.² .......................................... A01D 46/00
[52] U.S. Cl. .................................. 56/327 R; 56/10.2; 56/14.4; 56/155
[58] Field of Search ..................... 56/327 R, 119, 155, 56/10.2, DIG. 15, 15.6, 14.3–14.6, 2; 171/14, 31

[56] References Cited

U.S. PATENT DOCUMENTS

| | | | |
|---|---|---|---|
| 2,210,219 | 8/1940 | Sievers et al. | 56/119 |
| 2,949,716 | 8/1960 | Thomson | 56/14.3 |
| 3,624,990 | 12/1971 | Sinden et al. | 56/327 R |
| 3,653,194 | 4/1972 | Lachman | 56/DIG. 15 |
| 3,662,525 | 5/1972 | White | 56/155 |
| 3,736,734 | 6/1973 | Pavel | 56/119 |
| 3,921,375 | 11/1975 | Cetrulo, Jr. | 56/327 R |
| 4,124,970 | 11/1978 | Bernhardt | 56/10.2 |

Primary Examiner—Jay N. Eskovitz

[57] ABSTRACT

An attachment to a conventional tomato harvester to accommodate the harvesting of tomato crops in areas where tomato vines are grown through holes in sheet plastic, disposed atop the ground in the tomato fields. A shearing device is vertically pivotally carried centrally of the forward bottom end of a conveyor which transports the tomato vines rearwardly upwardly into the harvester, after being cut just above the sheet plastic, for removal of the tomatoes from the vines, as well as for cleaning, sorting, etc. Rearwardly of the shears, a pair of large rotary brushes feed the vines to a paddle wheel device which cooperates with the brushes in initiating the movement of the vines upwardly with the conveyor movement. A pair of electric switches, operably associated with the shears, control an up and down pivotal movement of the conveyor, by means of a solenoid operated hydraulic valve, to compensate for the rise and fall of the ground level, thereby maintaining a substantially constant spacing between the cutting edge of the shears and the top surface of the sheet plastic.

10 Claims, 5 Drawing Figures

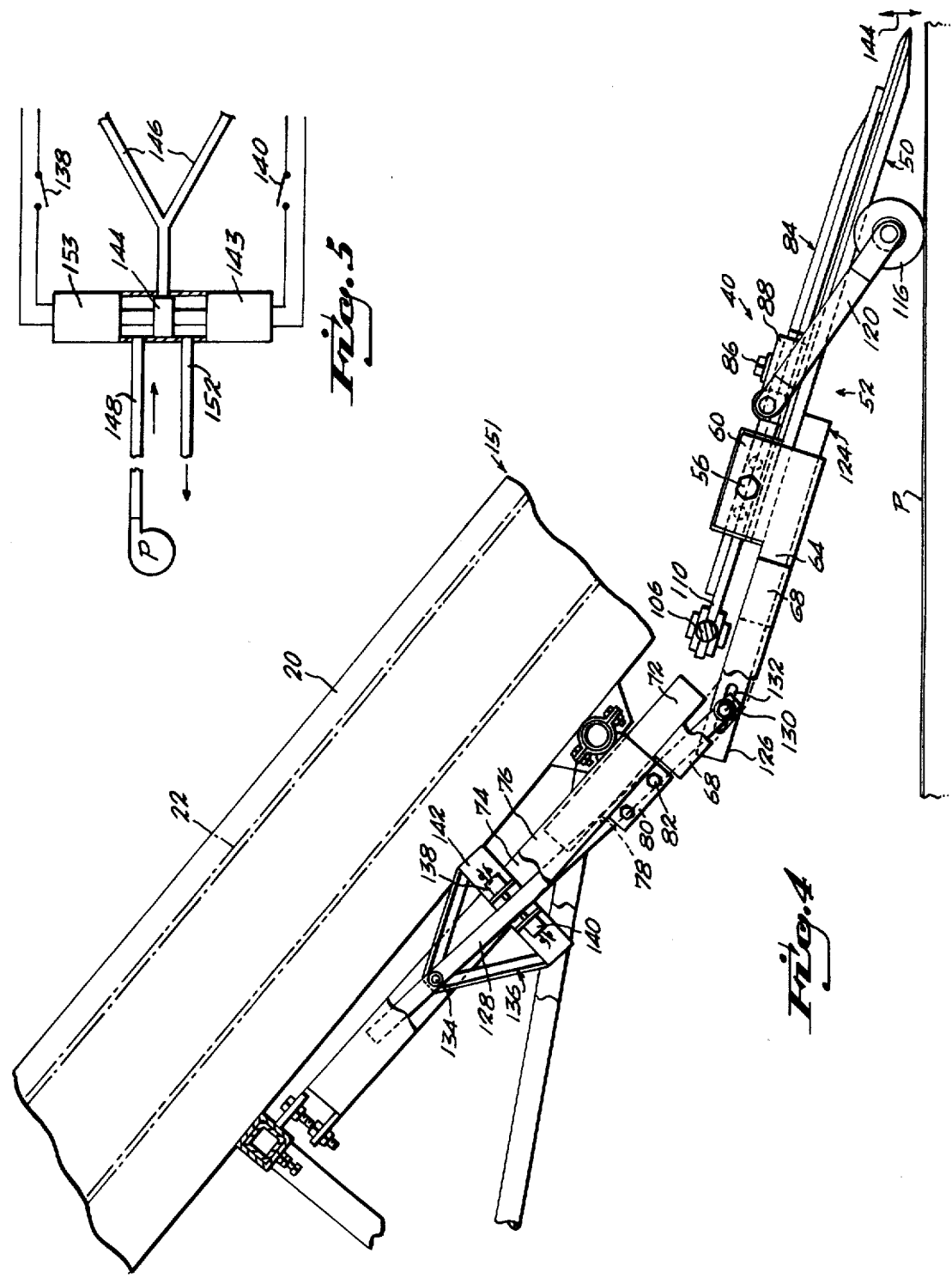

TOMATO HARVESTER ATTACHMENT

BACKGROUND OF THE PRESENT INVENTION

The present invention pertains to an attachment to a tomato harvester which enables an otherwise conventional tomato harvester device to harvest tomato crops in areas where the tomato vines are grown through holes in a sheet plastic material.

Tomato harvesters have been commonly used to harvest the tomato crop in various areas where large fields are planted with tomatoes, such as in California and other western states. However, tomatoes in these areas are grown in the conventional manner, that is, the seeds are planted directly in the ground with no ground cover. Therefore, the harvesters are provided with cutter means to generally cut the vines from their root systems just below ground level. Means are provided to engage the cut vines and move them onto an inclined conveyor for movement upwardly to the main body portion of the device where the tomatoes are removed from the vines, the dirt is removed and the tomatoes are sorted.

Tomato harvesters of this type are quite large and may, for example, be well over 30 feet long and employ an operator and a work crew of up to 26 persons. The harvester device can pick a load up to one-third faster than manual harvesters with substantially fewer persons involved. When large tomato crops are ripe, other crops often ripen at the same time and because of the urgency to harvest ripened crops in a relatively short period of time, a big problem often arises in acquiring sufficient help to accomplish the harvesting operation with manual harvesters.

In some areas, such as in the State of Florida, large tomato crops are grown, however, because of conditions in areas such as Florida, the tomato vines are grown through holes in relatively wide sheets of a thin plastic material generally black in color. The planting operation is also mechanized, the plastic sheet material is applied atop the ground from a large roll, holes are formed at spaced apart intervals along a central portion of the sheet as it is laid down and the seeds are generally automatically planted through the holes. The ground is plowed over the side edges of the plastic sheet to hold it in place.

Obviously the tomato harvesters, as presently constructed, which cut the tomato vines below ground level, cannot be used in Florida because of the plastic sheet material at ground level.

Therefore, one of the principal objects of the present invention is to provide tomato harvester of the above described type with cutter means to cut the tomato vines from their root systems a short distance above ground level.

Another prinicipal object of the present invention is to provide control means to compensate for the rise and fall of the ground level to maintain the cutter means at a relatively constant spacing above ground level.

A further object of the instant invention is to provide rotary brush means, mounted relative to a lower forward end of an existing tomato harvester conveyor, to engage and position the cut vines on the conveyor for upward movement to the main body portion of the harvester.

Yet another object of the present invention is to provide a driven paddle wheel means to cooperate with the rotary brush means in the movement of the tomato vines on the conveyor.

BRIEF DESCRIPTION OF THE DRAWINGS

FIG. 4 is an enlarged side elevational view of the lower forward end portion of FIG. 2 with parts broken away to better illustrate the invention; and FIG. 5 is a schematic diagram of a typical solenoid controlled hydraulic valve used to control the position of the cutting edge of the cutter device relative to ground level.

DETAILED DESCRIPTION OF A PREFERRED EMBODIMENT

Figure 1:
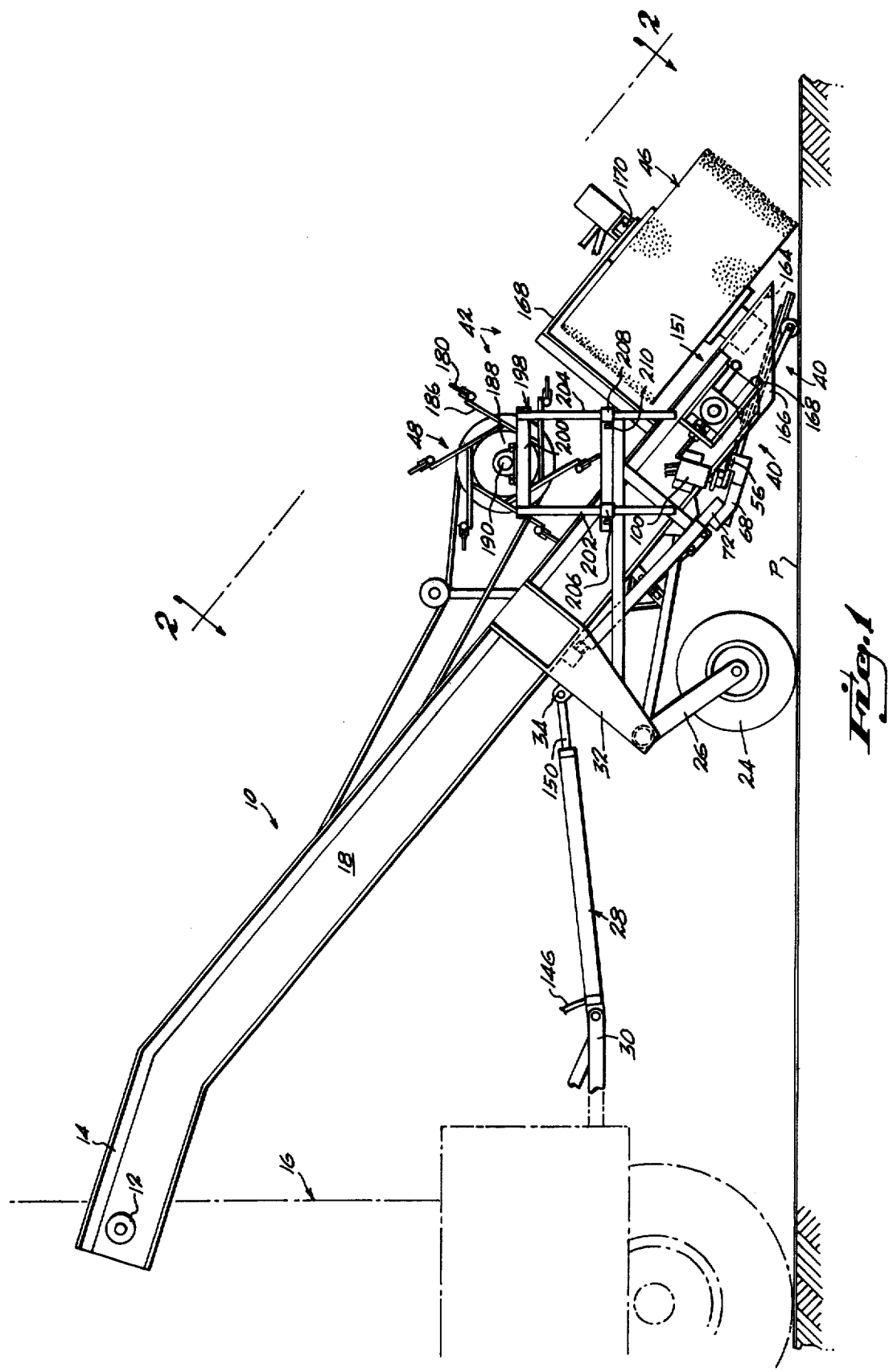
FIG. 1 is a side elevational view of a conveyor, pivotally attached at its rearward upper end to the main body portion of a conventional tomato harvester device, including the tomato vine cutter device, and rotary brush and paddle wheel means of the present invention.

With reference to the drawings in which like reference characters designate like or corresponding parts throughout the various views, and with particular reference to FIG. 1, a conveyor assembly, indicated generally at 10 is illustrated in pivotal connection at 12 at its rearward upper end 14 to the forward end of a conventional tomato harvester, illustrated fragmentarily at 16 in broken lines.

Figure 2:
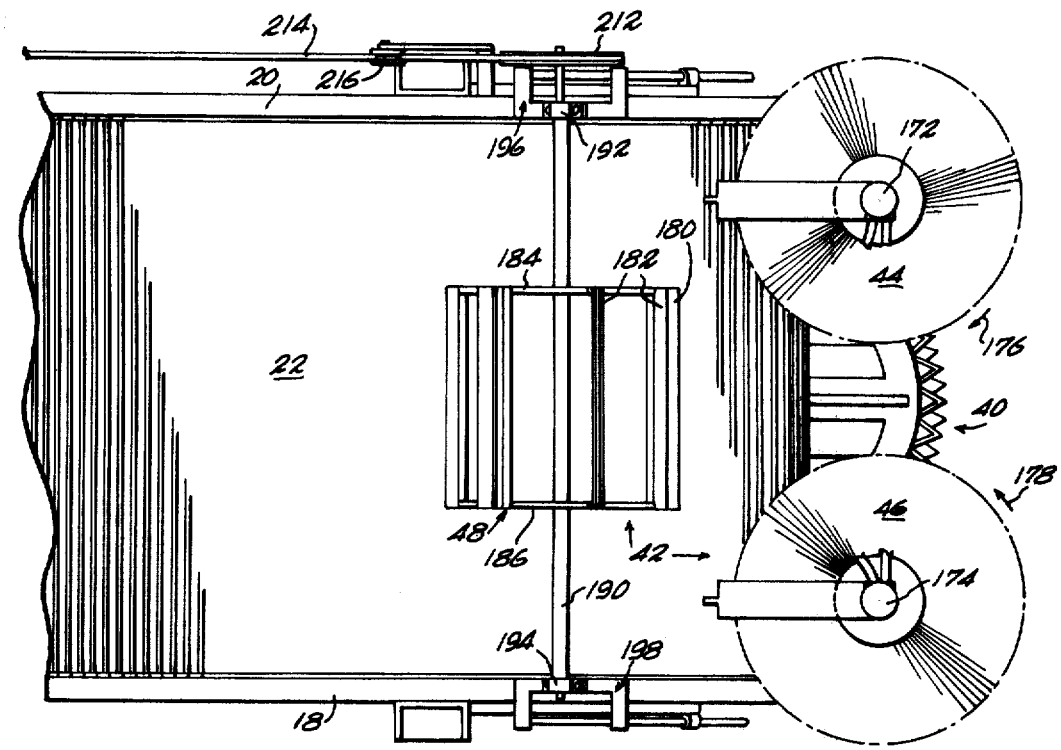
FIG. 2 is a top plan view of a lower forward end portion of the structure of FIG. 1 as seen along line 2—2 of FIG. 1.

The conveyor assembly 10 is generally conventional, including a pair of side rails 18, 20, FIG. 2, with a relatively wide chain conveyor belt 22 therebetween. The belt 22 is part of the existing structure and is driven in a conventional manner by upper and lower sprockets, fixed to transverse shafts, with a drive means at its upper end (not illustrated). A pair of opposed side conveyor wheels, one illustrated at 24 carried by a yoke member 26, are part of the existing conveyor assembly and serve to support and to stabilize the main weight of the conveyor assembly 10. A pair of opposed side hydraulic cylinder and piston assemblies, one illustrated in FIG. 1 at 28, are pivotally connected between the main body portion 16 of the harvester at 30 and a structural member 32 of the conveyor at 34. The hydraulic cylinder and piston assemblies 28 are conventionally controlled from the operator's station to position the conveyor 10 and particularly to elevate it for movement of the harvester to and from a job site or work area.

As stated, the above description of the conveyor system refers to the existing structure currently provided with the tomato harvester. Existing cutter means, for cutting beneath ground level, and means to initiate the movement of the cut tomato vines up the conveyor are removed from the forward lower end portion of the conveyor and replaced by the shears type of cutter head, designated generally at 40, and feed means 42 comprised of a pair of rotary brushes 44, 46 and a paddle wheel structure 48, immediately therebehind.

Figure 3:
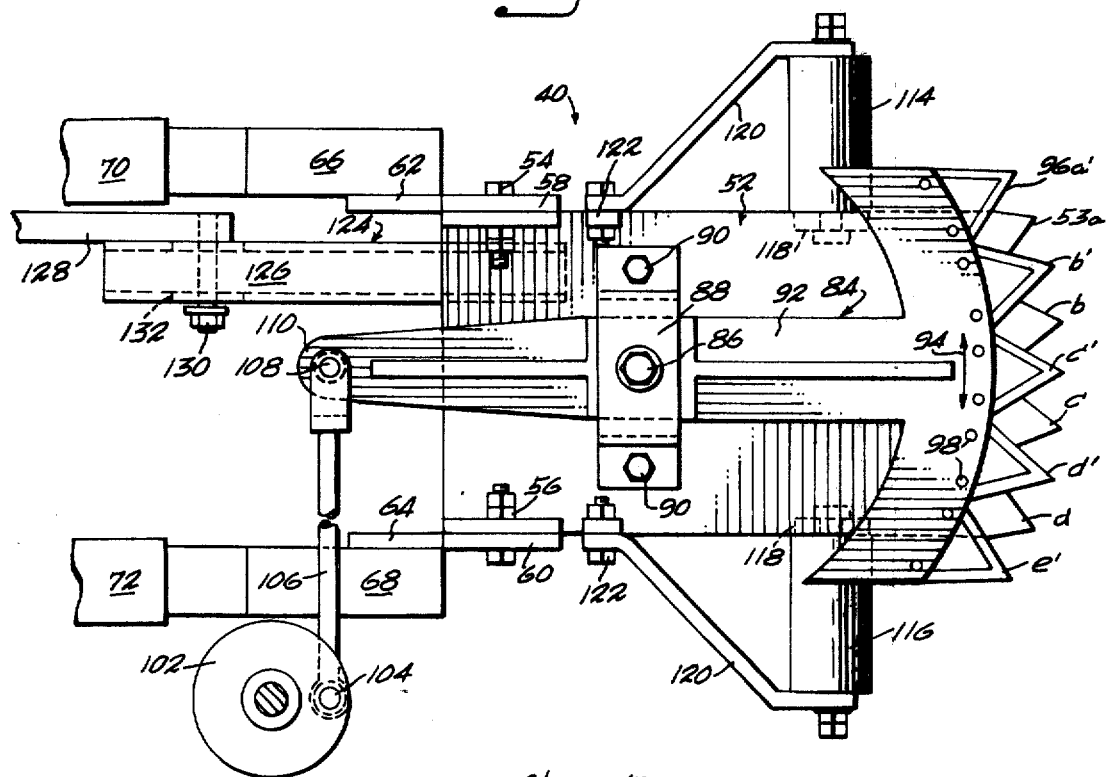
FIG. 3 is a top plan view of the vine cutter device of FIG. 1.

With reference to the cutter means 40, as particularly detailed in FIGS. 3 and 4, a bottom plate 50 includes a main rearwardly extending portion 52 and a saw tooth forward end comprised of a plurality of forwardly pointed generally triangular shaped sharpened teeth 53$a$, $b$, $c$, and $d$. Bottom plate 50 is pivoted at 54, 56, FIG. 3, at its opposed sides to respective upstanding ears 58, 60 of plates 62, 64 which are fixed as by welding to respective angular members 66, 68 which are, in turn, fixed to respective tubular members 70, 72, FIGS. 1, 3 and 4, carried in respective existing structural tube members 74, 76. In a preferred form each member 74 and 76 is slotted as at 78 and includes ears, such as 80 on each side of the slot 78, with lock bolt and nut assemblies 82 to adjustably slidably receive and lock the tubular members 70, 72 in a selected position to properly position the cutter means 40.

As oscillating top cutter assembly 84 is pivoted atop the bottom plate 50 as at 86. Pivot 86 extends through a bridge bracket 88, fixed at 90 to cutter plate portion 52, a rearwardly extending oscillating arm 92 of top cutter 84 and bottom cutter plate portion 52, top cutter 84 thereby being free for oscillating movement indicated by arrow 94. Cutter 84 includes an arcuate forward end portion with a plurality of generally triangular shaped sharpened teeth 96a', b', c', d', and e' fixed thereto at 98. As illustrated, the upper and lower cuter teeth 53 and 96 are in arcuate alignment and in kissing contact to provide a compound shearing action when the top cutter 84 is oscillated.

The existing hydraulic system of the tomato harvester is utilized to operate a hydraulic motor 100, FIG. 1, to drive the eccentric 102, FIG. 3, pivotally connected at 104 to a drive like 106, pivotally connected at 108 to a top cutter arm extension 110 by means of any appropriate type of universal drive connection.

As best illustrated in FIGS. 3 and 4, a pair of opposed follower rollers 114, 116 are rotatably journaled under the cutter head between respective pairs of ears 118 and links 120 connected at 122 to the bottom plate portion 52. Rollers 114, 116 comprise terrain followers which roll over the top of the plastic sheets P and follow the contour of the ground surface thereunder. As best illustrated in FIGS. 3 and 4, a rigid member such as tube 124 is fixed as by welding to bottom plate portion 52 and extends rearwardly therefrom as at 126.

With particular reference to FIG. 4 a link 128 is pivotally connected at 130 through a slot 132 in the extended end 126. At its rearward end, link 128 is pivotally connected at 134 to a triangular bracket 136, fixed to any appropriate existing conveyor structural member such as 74. Intermediate the length of link 128, a pair of electric switches 138, 140, are carried on one arm 142 of triangular bracket 136 on vertically opposed sides of links 128. Switches 138, 140 are connected in the existing electrical system of the harvester.

In operation, when the cutter head 40 is pivoted up or down, as indicated by arrows 144, by the contour of the ground surface, the cutter head 40 will pivot vertically about the fixed pivots 54, 56 causing up and down movement of the extended end 126 of rigid member 124. This movement is transmitted to link 128 by means of the movable pivot 130 in slot 132 resulting in link 128 being vertically pivoted about pivot 134 which is stationary relative to the conveyor 10. Switches 138, 140 will thereby be sequentially activated to compensate for the up and down movement of rollers 114, 116 by raising or lowering the leading end of the conveyor to maintain the leading tip ends of cutter blades 53, 96 at relatively constant distance above the ground surface and sheet plastic P.

For example, if the ground surface rises, blades 53, 96 will be raised and the end 126 of rigid member 124 will be lowered about pivots 54, 56, causing link 128 to pivot downwardly about fixed pivot 134, energizing the switch 140. Switch 140 energizes a first solenoid 143, FIG. 5, actuating a hydraulic valve 144 to open the conduits 146, FIGS. 1 and 5 to the pressure conduit 148 from the existing hyraulic pump P. This results in the extension of piston rods 150 of assemblies 28, FIG. 1, to raise the leading end 151 of the conveyor 10, resulting in the raising of the rearward end of the cutter head 40 and end 126 of rigid member 124 causing pivotal movement thereof about pivots 54, 56 to lower the cutter blades 53, 96. Simultaneously, the link 128 is pivoted upwardly about pivot 134 to de-energize switch 140 causing the solenoid 143, which is spring loaded, to return the valve 144 to its neutral position stopping the flow of pressurized fluid to piston 150.

The follower rollers 114, 116, when lowered by the ground surface contour, will cause the opposite situation to occur, the link 128 will energize switch 138, opening the fluid conduits 146 to the exhaust conduit 152, by means of a second solenoid 153 permitting the forward end 151 of the conveyor 10 to drop and, consequently, to cause pivotal movement of the cutter head 40 about pivots 54, 56 to raise the cutter blades 53 and 96.

It should be noted that the switches 138, 140 are preferably positioned closely adjacent to the opposed sides of link 128 whereby, in connection, a constant adjustment and readjustment occurs to maintain the desired cutting distance above ground level. If desired, the switches 138, 140 may be adjustably positioned in tracks by set screws (not shown).

With reference to FIGS. 1 and 2, the pair of large rotary brushes 44, 46 are rotatably mounted adjacent the forward end of the conveyor. Each brush 44, 46 is rotatably mounted between a top plate 164 of a side frame extension 166 and an angle arm 168, journaling the top end of the brush shaft 170. Each extesion 166 is bolted as at 168 to the rear end of one side member 18 and 20. A pair of hydraulic motors 172, 174 are operably connected to the respective brush shafts 170. Motors 172, 174 are fixed atop the angle arms 168 and are operably connected in the existing hydraulic system.

As seen from the top, FIG. 2, the brushes 44, 46 are preferably spaced apart a distance to provide a space between the outer circumferences thereof which is substantially equal to the width of the cutter blade portion of the cutter head 40; and they are driven in opposite directions, indicated by arrows 176, 178, to continually feed the tomato vines onto the conveyor as they are cut by the cutter head 40.

A secondary means in the form of a paddle wheel 48 may be employed to assist the brushes 44, 46 to initiate the movement of the tomato vines up the conveyor. The paddle wheel 48 is comprised of plurality of transverse paddles 182, provided with rubber blade portions 180, extending outwardly on end rods 184, 186 fixed tangentially to a pair of opposed end discs 188 (one illustrated) mounted on a transverse shaft 190, journaled in bearing blocks 192, 194. Bearing blocks 192, 194 are fixed atop respective adjustable frame assemblies 196, 198 each of which includes a top bar 200, mounting a bearing block such as 192, and a pair of upright side rods 202, 204 engaged through respective fixed collars 206, 208, provided with set screws 210 for vertical adjustment of the paddle wheel 180. As illustrated in FIG. 2, a pulley 212, connected to one end of the shaft 190, is engaged by a drive belt 214 which is driven from an existing power take-off for the conveyor (not shown) at the top end thereof. An adjustable tensioning pulley 216 is provided for the drive belt 214.

In operation, the harvester is driven along a line of tomato vines with said vines in alignment with the cutter head. The vines are cut by the shearing action of the above described blades and are engaged, first, by the rotary brushes 44, 46 and, second, by the paddle wheel 48 to initiate their movement up the existing conveyor belt which is driven by the existing power means at the top end thereof.

It should be noted that the rows of tomato vines in this operation are very regular because the planting operation, as above described, is mechanized so the positioning of each vine is determined by the positioning of the holes which are prefectly positioned in an aligned condition.

What is claimed is:

1. A cutter and tomato vine feed device in combination, for attachment to the lower forward end of an existing driven conveyor for use in harvesting tomatoes in fields where it is desirable to cut the tomato vines from their root systems above the ground level and to feed the cut vines onto the lower forward end of the conveyor for rearward upward movement into the main body portion of the existing tomato harvester device, the cutter and feed device comprising:
    a cutter head including a first cutter member provided with a first plurality of teeth extending forwardly of a central portion of a forward end of the conveyor, a second cutter member provided with a second plurality of teeth in generally aligned contact with said first teeth and means to oscillate said second member relative to said first member to provide a shearing action between said first and second teeth,
    means to pivotally attach said cutter head beneath the forward end portion of the conveyor, substantially rearwardly of said first and second teeth, to provide for vertical pivotal movement thereof,
    follower means fixed to said cutter head intermediate said pivotal attachment and teeth, and between said head and the surface of the ground to impart vertical pivotal movement to said head in direct response to vertical variations in the ground level, when the harvester is in operation, to maintain said teeth above ground level at all times;
    rotary vine engaging means comprised of a pair of relatively large rotary members of predetermined diameters, rotatably mounted above the forward end of the conveyor in a predetermined spaced apart relation,
    drive means to rotate said rotary vine engaging members in opposed directions to engage and feed tomato vines cut by said cutter head onto said conveyor for movement into the main body portion of the harvester device, and
    means operably connecting between a pair of existing opposed side hydraulic cylinder and piston assemblies and said cutter head to respond to said cutter head vertical pivotal movement to raise and lower the forward position of the conveyor in direct relation to the vertical variations in the ground level to automatically compensate for said variations in a manner so as to maintain said cutter teeth at a substantially constant elevation above the surface of the ground, the hydraulic cylinder and piston assemblies conventionally providing for manual control of raising and lowering of the conveyor.

2. The device as defined in claim 1 wherein said operably connecting means includes a link pivotally connecting at a first end through a longitudinally slotted rearwardly extending end portion of a rigid member fixed to said cutter head, and pivotally connected to a fixed pivot at a second end whereby said link is vertically pivoted about said fixed pivot in response to said cutter head vertical pivotal movements.

3. The device as defined in claim 2 wherein said operably connecting means includes a pair of electric switches connected in an existing electrical system provided on the harvester, said switches being fixed intermediate said first and second end pivots with a first switch of said pair being closely positioned below said link and a second switch of said pair being closely positioned above said link, whereby said first and second switches are sequentially energized in direct response to said link and cutter head vertical pivotal movements.

4. The device as defined in claim 3 including a hydraulic valve and a first solenoid operably connected thereto in electrical connection to said first switch to shift said valve to provide pressurized fluid from an existing hydraulic pump to the hydraulic cylinder and piston assemblies, when said first switch is energized, to elevate the forward end of the conveyor; and a second solenoid, operably connected to said hydraulic valve, in electrical connection to said second switch to shift said valve to an exhaust position when said second switch is energized to permit the forward end of the conveyor to descend to a lower position.

5. The device as defined in claim 1 wherein said second cutter member is pivotally attached, intermediate its length, to said first cutter member.

6. The device as defined in claim 5 wherein said means to oscillate comprises a hydraulic motor with an eccentric and crank arm connection to a rearwardly extended portion of said second cutter.

7. The device as defined in claim 1 wherein said follower means comprises a pair of rollers extending outwardly from respective opposed sides of said cutter head.

8. The device as defined in claim 1 wherein said drive means comprises a hydraulic motor in driving connection with a central shaft of each of said rotary vine engaging means.

9. The device as defined in claim 1 including a paddle wheel rearwardly of said rotary brushes and generally spanning the distance therebetween, said paddle wheel including drive means and being disposed transversely across the conveyor in a predetermined spaced relation thereabove to permit a plurality of paddle blades to sequentially engage cut tomato vines on the conveyor to cooperate with said rotary vine engaging means in initiating their movement upwardly and forwardly on said conveyor.

10. The device as defined in claim 9 wherein said paddle blades are formed of a relatively soft flexible material such as rubber.

* * * * *